UNITED STATES PATENT OFFICE.

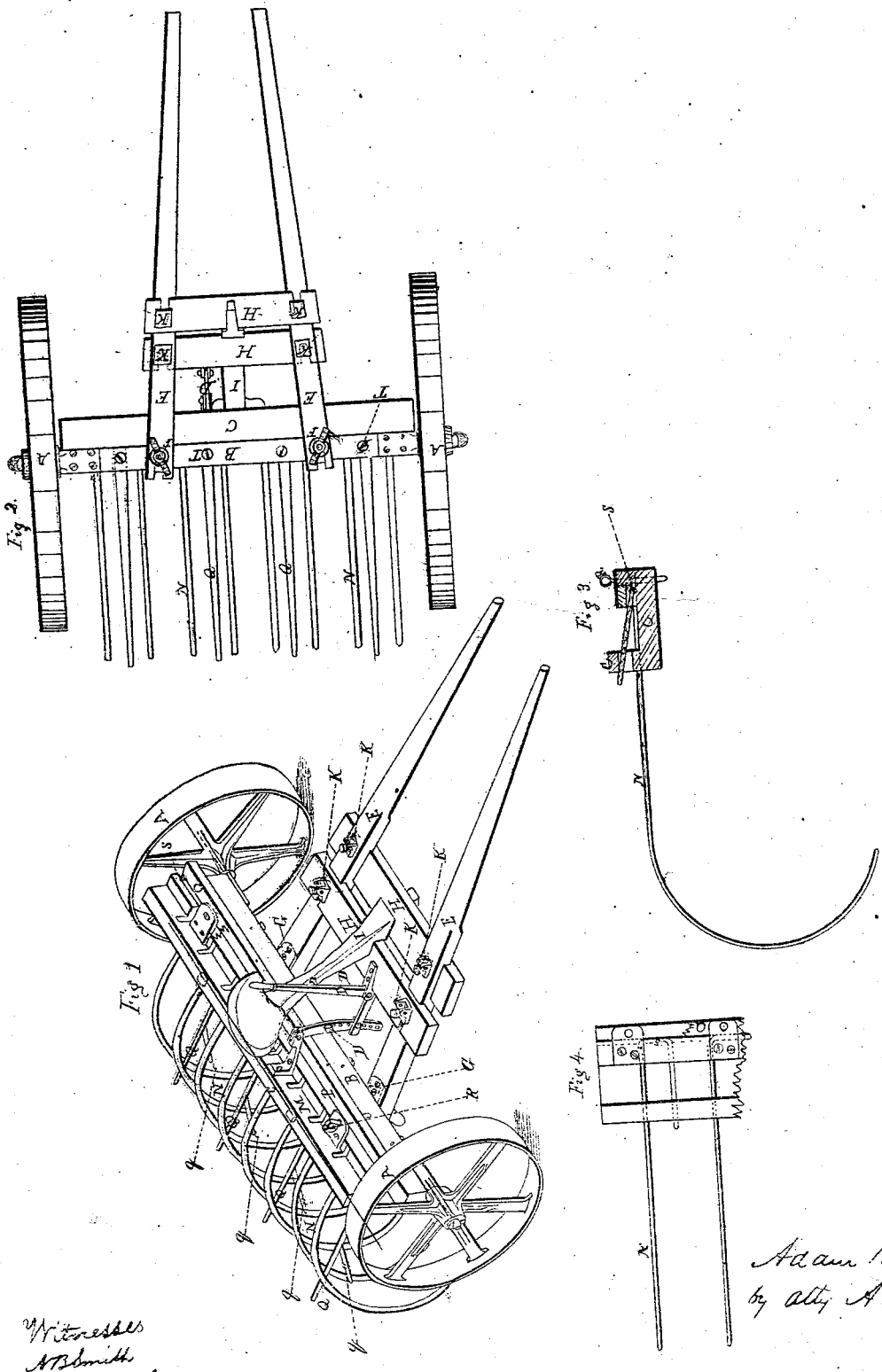

ADAM R. REESE, OF PHILLIPSBURG, NEW JERSEY.

Letters Patent No. 84,760, dated December 8, 1868.

---

IMPROVEMENT IN HORSE-RAKES.

---

The Schedule referred to in these Letters Patent and making part of the same.

---

*To all whom it may concern:*

Be it known that I, ADAM R. REESE, of Phillipsburg, county of Warren, and State of New Jersey, have invented certain new and useful Improvements in Horse-Rakes, of which the following is a full, clear, and exact description, reference being had to the accompanying drawing, making part of this specification, in which—

Figure 1 is a perspective view, and

Figure 2 is a plan view, representing the under side of the rake.

My invention consists of an improved construction of horse-rakes, whereby their cost may be reduced, and, at the same time, they may be more easily taken apart for storage, after the season for harvesting is over, or for transportation.

Similar letters of reference denote corresponding parts in both figures.

In the accompanying drawing—

A A are the wheels.

B, the axle, upon which is mounted the rake-head C, hinged in such a manner that it can be vibrated by means of the bent lever D and connecting-links D'.

E E are the shafts or thills, attached to the axle by means of the bolts F F, fig. 2, and the plates or clamps G G, fig. 1, which have flanges or ears turned up on their rear ends. These, being held in a proper position by the bolts F F, hold the shafts securely, while, by turning the nuts backward far enough to let the flanges drop below the axle, they (the shafts) can be easily removed by slipping them out of the notches or gains shown in fig. 2.

The shafts are properly braced by the bars H, each recessed to fit the shafts, and also provided with gains. One of these bars is placed on the upper, and the other upon the lower side of the shafts, with the relative position of the gains reversed.

The standard I (supporting the seat) having its lower end tenoned to fit a socket, as it were, formed by cutting notches on the inner edges of the bars, is then inserted at an angle, and, like a key, prevents them from being jarred out of place, even though the nuts do become loosened by the jarring of the rake while in motion.

The bolts F F, K K are made of sufficient length to allow the shafts and bars to be taken apart without taking the nuts entirely off. The ends of the bolts are then riveted or upset, so as to prevent the nuts from coming off, which saves all annoyance from their being accidentally lost.

The nuts K K have ears, with holes through them, so that they can be tightened or loosened by inserting a small iron bar through them, in place of using a wrench.

I make the rake-head with the usual slots, $c'$, for the vertical play or vibration of the teeth. Said slots extend nearly through the head, terminating at a rebate upon the upper surface of the opposite side of the head, as shown at O, fig. 1.

The teeth N are formed with a return arm parallel to and in the same horizontal plane with the tooth. They are each made of one piece by bending into the required shape. The return arm serves the purpose of a spring to keep the tooth down upon the ground, being fixed at one end, while the tooth is free to vibrate, that portion lying between the tooth proper and the return arm being confined in a groove, S, in the bottom of the rebate in the head of the rake, and serving as a hinge for that purpose.

The axle is mortised or otherwise perforated at points intermediate between the teeth on the rake-head and the cleaner-rods Q inserted therein, and secured by pins or screws T, in such manner that, by simply removing said screws or pins, the cleaners may be readily removed for packing or transportation.

The cleaners Q are armed with spurs, $q$, shown in fig. 1, which project from their under sides for the purpose of penetrating the hay, and preventing it from rolling and being formed into a rope while the teeth are gathering their load. These spurs are set at such an angle to the cleaner-rods as will permit their ready withdrawal by the forward motion of the rake, when the teeth are raised to discharge their load.

Having thus described my invention,

What I claim, and desire to secure by Letters Patent, is—

1. The teeth N, provided with the return arm, arranged relatively to, and operating in connection with the rake-head, substantially as described.

2. The shafts E E, when provided with the gains or notches, as set forth.

3. The standard I, in combination with the transverse bars H H, arranged upon opposite sides of the shafts E E, said bars being provided with gains, and operating as set forth.

4. The bars H H, when provided with the gains, as set forth.

5. The combination of the notched shafts E E, plates G G, axle B, and bolts F F, substantially as set forth.

6. The combination of the notched bars H H, shafts E E, and bolts K K, all arranged and operating as set forth.

7. The removable cleaners, adapted to be secured to the axle by means of screws or pins, and removable for transportation, as set forth.

8. The spurs on the cleaner-rods, for the purpose, and substantially as set forth.

ADAM R. REESE.

Witnesses:
JOHN S. HOLLINGSHEAD,
JOHN S. HOLLINGSHEAD, Jr.